Figure 1:
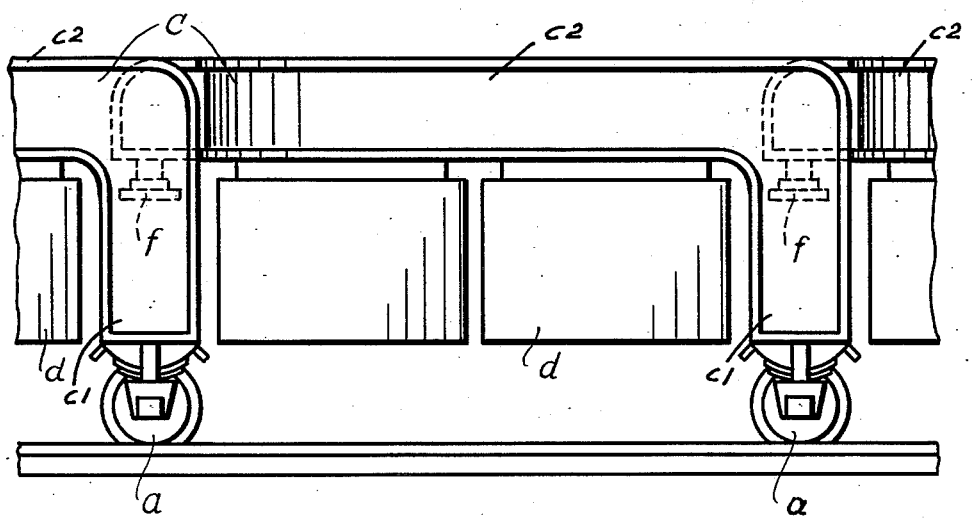

Dec. 10, 1957  W. BÄSELER  2,815,720
RAIL VEHICLES FOR TRANSPORTING CONTAINERS, VESSELS, STREET
VEHICLES AND THE LIKE
Filed Dec. 14, 1953

INVENTOR
Wolfgang Bäseler
By
Patent Agent

United States Patent Office 2,815,720
Patented Dec. 10, 1957

2,815,720

RAIL VEHICLES FOR TRANSPORTING CONTAINERS, VESSELS, STREET VEHICLES AND THE LIKE

Wolfgang Bäseler, Munich-Grafelfing, Germany

Application December 14, 1953, Serial No. 398,132

Claims priority, application Germany December 15, 1952

2 Claims. (Cl. 105—3)

The present invention relates to rail vehicles and, more specifically, to rail vehicles for transporting containers, vessels, street vehicles and the like.

The invention is particularly concerned with the transportation of larger or smaller loading containers or the like on rail vehicles in the so-called container or vessel traffic. The terms "containers, vessels or the like" as used in connection with the present application is not limited to mere large boxes or similar containers but is to be broadly understood also to include street vehicles irrespective of whether or not their undercarriage or chassis is to be removed prior to the loading or remains on the vehicle. The said term "containers, vessels or the like" may also comprise additional means connected to such containers, which facilitate the transportation and the transfer or reloading of such containers to rail vehicles or street vehicles such as hooks, ears, rollers, small auxiliary wheels or the like. Finally the term "containers, vessels or the like" also includes other appropriate articles provided they will meet the requirements set forth further below, i. e. can be stored in the space provided therefor and can be adapted to a proper mounting, as for instance war and road building machines.

With the above in mind, it is known that generally when loading such containers into rail vehicles, special loading platforms or special lifting devices are required. The necessity of such loading ramps or special lifting devices, however, makes it difficult at various places which would otherwise be suitable for a fast transit or transloading, to effect the loading of rail vehicles with such containers, vessels or the like. Thus, on open railroad lines where no loading ramps are available, it is particularly difficult to load such containers, vessels or the like into railroad cars. Attempts have been made to remedy this situation by providing two crane gibs or crane beams on separate pivot mountings which have to be coupled with the load to be transported to a rigid unit in the manner of a bridge girder and which by lifting or lowering are intended to receive or set down the load. The necessity of availing oneself of such pivot mountings with crane beams still imposes a considerable handicap as to the effecting of a fast transit or reloading, particularly inasmuch as such machinery is not always available, has to be transported from place to place and in addition thereto requires some skilled operators.

It is, therefore, an object of the present invention to provide a rail vehicle which will materially simplify the desired fast transit or reloading without such complicated machinery as referred to above.

It is a further object of this invention to provide a rail vehicle for transporting containers, vessels or the like which will make it possible without the provision of loading ramps, crane beams or similar lifting devices to load and unload containers, vessels or the like in a very simple and fast manner even on open railroad lines.

A still further object of this invention consists in the provision of a rail vehicle of the above mentioned type which is relatively simple in construction and the costs of production of which are relatively low while the loading or unloading work to be effected in connection therewith can be carried out in a rather short time.

These and other objects and advantages of the invention will appear more clearly from the following specification in connection with the accompanying drawings in which:

Fig. 1 diagrammatically illustrates a railway car according to the present invention.

Figure 2:
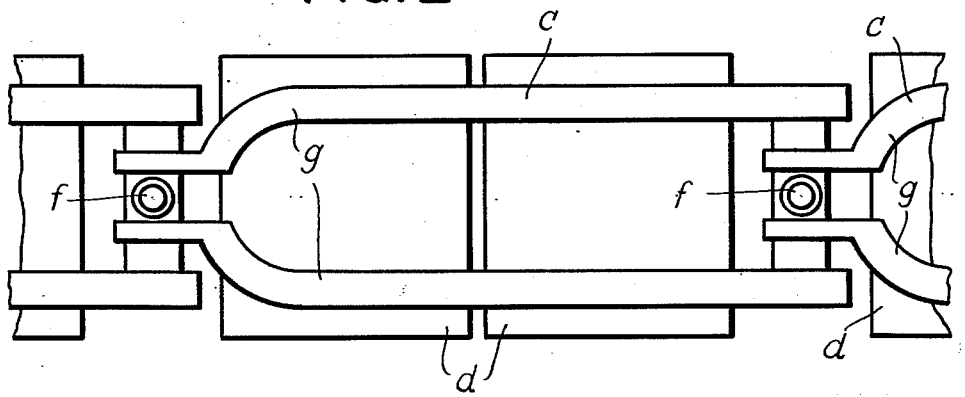

Fig. 2 is a top view of Fig. 1.

General arrangement

The rail vehicle according to the present invention has no bottom proper which serves as actual supporting part of the vehicle but instead is provided with a arch or semi-arch-like structure on which the respective container to be transported is suspended or mounted. The arrangement of said arch or semi-arch-like structure is such as to make possible the loading of the vehicle from the sides thereof without ramps or complicated lifting devices thereby allowing a fast loading and unloading even on open railroad lines.

Structural arrangement

Referring now to the drawings in detail, it will be seen therefrom that the supporting part of the railway car is designed in the manner of a semi-arch-shaped beam $c$ having a substantially vertical leg $c1$ below which there are mounted the wheel sets or bogie trucks $a$. The semi-arch-shaped beam $c$ furthermore has a substantially horizontal leg $c2$. The free end of the horizontal leg $c2$ of each semi-arch-shaped beam $c$ of each vehicle rests on a joint $f$ within the vertical leg $c1$ of the adjacent vehicle. In order to make it possible to introduce said free end into the vertical leg of the adjacent vehicle, the supporting sidewalls are somewhat bent inwardly at $g$ to reduce the distance therebetween as is clearly shown in Fig. 2. Containers $d$ to be transported by the vehicle which may be of any desired size and shape fitting below the semi-arch-shaped structure $c$ are suspended on the beam $c$ in any desired manner. The said containers $d$ are loaded onto the vehicle by moving the containers from one side of the vehicle on appropriate street vehicles or auxiliary vehicles below the railway car. As soon as the containers $d$ are in a proper position below the semi-arch-shaped beam $c$, they are connected thereto in any convenient manner. The containers $d$ may also be complete vehicles with wheels for street traffic. In this instance such vehicle can by its own power drive below the semi-arch-shaped beam $c$ and then by means of block and tackle or other convenient lifting means be slightly lifted off the ground and be connected to the beam $c$. It is, of course, also possible to get along without any lifting means at all by merely placing some boards below the arch-shaped beam $c$ which, when the vehicle drives on said boards, bring the vehicle into the proper height for connection with the semi-arch-shaped beam $c$. It is then merely necessary after such connection has been made, to pull the boards away underneath the wheels. The unloading can, of course, be effected in the reverse manner.

In order to avoid that the framework of the railway car will not be torn apart or pushed together by the relatively strong pulling or pushing forces of the locomotive which forces are usually effective at the level of the buffers, various auxiliary means may be employed. Thus, a number of the vehicles according to the present invention may be coupled together in such a manner that the longitudinally effective forces of the train pass exclusively through the upper portion of the semi-arch-shaped gate structure the legs $c2$ of which thus merely act as supports to which the wheel sets or bogie trucks are connected. If desired, also the pulling or pushing forces may be distributed over the entire train so that more or less, each train portion is moved by itself and the individual vehicles will not have to absorb pulling or pushing forces from the next vehicle. This is particularly simple if the train is made up as a continuously closed driving unit.

The term "suspended" or "suspending" as used in the preceding description is to be interpreted broadly. It does not mean that the container or the like must always be suspended directly on the horizontal portion of the semi-arch-shaped structure c. The term "suspending" or "suspended" also comprises the possibility of connecting the respective load in an appropriate manner to the vertical legs of the semi-arch-shaped structure c. If desired, the semi-arch-shaped structure may also be provided with inwardly protruding portions supporting beams or the like upon which the containers when moved into the vehicle from the side thereof may rest either directly or indirectly through the intervention of small rollers so that additional suspension means are not necessary. The containers may, of course, also be provided with lateral protruding portions adapted to rest on the protruding portions, beams or the like of the vehicle.

The supporting beams or brackets of the semi-arch-shaped structure of the vehicle may be arranged so that they can be lifted and lowered. In such an instance the container may be moved into the vehicle while such beams or brackets are in their lowered position, and after the container has reached its proper position below the semi-arch-shaped structure, said beams or brackets are lifted manually or mechanically to such an extent that the container will be at the proper level, while it is simultaneously held stationary by said beams or brackets.

It is, of course, understood that the present invention is, by no means, limited to the particular constructions illustrated by way of example in the accompanying drawings but also comprises any modifications within the scope of the appended claims.

What I claim is:

1. A pair of cargo rail vehicles arranged one behind the other and provided with wheel sets for railroad traffic, one of said vehicles comprising a load-supporting structure resembling substantially an inverted L having a shorter substantially vertical beam structure supported by one of said wheel sets and having a substantially horizontal beam structure connected to and supported by the upper end of said vertical beam structure, said horizontal beam structure comprising two horizontal substantially parallel sections extending in the traveling direction of said vehicle, the free end of said horizontal beam structure being pivotally supported by said other vehicle, said L-shaped load-supporting structure being open at both sides to allow introduction of a load between said horizontal beam structure and the lowermost level of said wheel sets from either side of said load-supporting structure.

2. A vehicle provided with railroad wheels for railroad traffic, which comprises in combination: a vertical beam structure supported by said wheels and forming one end portion of said vehicle, a horizontal beam structure including two arms having one end thereof rigidly connected to and supported by said vertical beam structure, at least the major portion of said arms being parallel to each other and extending in the direction of travel of said vehicle, means supported by the other ends of said arms for rigidly interconnecting the same, and means supported by said last-mentioned means for detachably journalling the latter to a vertical beam structure of another vehicle.

References Cited in the file of this patent

UNITED STATES PATENTS

| | | |
|---|---|---|
| 124,734 | Gird | Mar. 19, 1872 |
| 904,525 | Frederick | Nov. 24, 1908 |
| 1,565,079 | Foreman | Dec. 8, 1925 |
| 1,973,030 | Webber | Sept. 11, 1934 |
| 2,048,580 | Webber | July 21, 1936 |
| 2,197,375 | Dafnis | Apr. 16, 1940 |
| 2,317,784 | Lewis | Apr. 27, 1943 |
| 2,333,208 | Spear | Nov. 2, 1943 |
| 2,342,408 | LeTourneau | Feb. 22, 1944 |
| 2,399,304 | Watkins | Apr. 30, 1946 |
| 2,442,273 | Lofshult | May 25, 1948 |
| 2,679,329 | Stout | May 25, 1954 |
| 2,708,887 | Van Alstine | May 24, 1955 |